United States Patent [19]

Gandhi et al.

[11] Patent Number: 4,919,903

[45] Date of Patent: Apr. 24, 1990

[54] METHOD OF CATALYTICALLY OXIDIZING METHANOL VAPOR ACCOMPANIED BY LITTLE OR NO EXCESS OXYGEN

[75] Inventors: Haren S. Gandhi; Eugene C. Su, both of Farmington Hills, Mich.

[73] Assignee: Ford Motor Company, Dearborn, Mich.

[21] Appl. No.: 921,027

[22] Filed: Oct. 20, 1986

[51] Int. Cl.$^5$ .............................................. B01D 53/36
[52] U.S. Cl. .................................. 423/213.5; 423/245.3
[58] Field of Search ............ 423/213.5, 213.7, 245 R, 423/245 S, 245.3

[56] References Cited

U.S. PATENT DOCUMENTS

| | | | |
|---|---|---|---|
| 3,966,391 | 6/1976 | Hindin et al. | 423/213.5 |
| 3,993,572 | 11/1976 | Hindin et al. | 423/213.5 |
| 4,304,761 | 12/1981 | Yao | 423/213.2 |
| 4,378,307 | 3/1983 | Brunelle et al. | 423/213.5 |
| 4,450,244 | 5/1984 | Domesle et al. | 423/213.5 |
| 4,673,556 | 6/1987 | McCabe et al. | 423/245 |

OTHER PUBLICATIONS

Dixon et al, Catalysis 7, pp. 183, 231–236, Rheinhold, N.Y. 1960.
Edwards, Journal of Catalysis, vol. 50, p. 24 1977.
Santacesaria et al, Chemical Engineering Science, vol. 36, p. 909, 1981.

Primary Examiner—Jeffrey Edwin Russel
Attorney, Agent, or Firm—Joseph W. Malleck; Roger L. May

[57] ABSTRACT

A method is disclosed of substantially completely catalytically oxidizing methanol vapor and/or formaldehyde vapor contained in low concentration in a heated carrier gas having little or no excess oxygen, such as in the treatment of exhaust gases from methanol-fueled internal combustion engines calibrated for stoichiometric air/fuel mixtures. The process comprises treating said gas mixture by means of a dispersed catalyst consisting of palladium and of (i) rhodium in a weight ratio of Rh/Pd of 0–0.3, and/or (ii) $CeO_2$ in a weight ratio of $CeO_2$/Pd of 0–50, the treatment converting at least 96% of the methanol to $CO_2$ and $H_2O$ and with less than 1% of converted methanol as aldehydes, and converting at lest 85% of the formaldehyde in said exhaust gas to $CO_2$ and $H_2O$.

The invention achieves high methanol conversion efficiency with little or no production of aldehydes by using palladium as a catalyst which has been shown to be effective for methanol conversion at low exhaust gas temperatures with little or no excess oxygen. The palladium may also be accompanied by rhodium and/or cerium oxide, the latter two serving, respectively, to enhance the control of nitrogen oxides emissions from the internal combustion engine and to improve catalyst support stability, catalyst activity for carbon monoxide oxidation and oxygen storage capacity.

8 Claims, No Drawings

METHOD OF CATALYTICALLY OXIDIZING METHANOL VAPOR ACCOMPANIED BY LITTLE OR NO EXCESS OXYGEN

BACKGROUND OF THE INVENTION

This invention is directed to a method of substantially completely catalytically oxidizing methanol vapor and/or formaldehyde vapor contained in a heated carrier gas and, more particularly, to a method of treating exhaust gases generated by burning a methanol fuel in an internal combustion engine.

2. Description of the Prior Art

Catalytic oxidation of methanol has been the subject of a number of laboratory investigations mainly concerned with the oxidation of methanol to formaldehyde and not by an oxidation method which produces little or no formaldehyde. See Dixon, J.K. and Longfield, J.E., *Catalysis* 7, pages 183, 231–236, Rheinhold, New York (1960); Edwards, J., *Journal of Catalysis*, Vol. 50, page 24 (1977); Santacesaria, E. and Marbidelli, M., *Chemical Engineering Science*, Vol. 36, page 909 (1981).

More recently the interest in methanol as a viable alternative fuel for automobiles has led to the search for catalysts which completely oxidize methanol vapor with little or no production of aldehydes in the purification of exhaust gases from methanol-fueled vehicles. The untreated exhaust gas contains, among other oxidation products, appreciable amounts of formaldehyde and unburned methanol fuel, especially during the engine warm-up period. Since formaldehyde, known as an eye irritant and a potential carcinogen, is an intermediate product from the oxidation of methanol, its emissions from methanol-fueled vehicles desirably should be minimized by catalysts highly effective for the complete oxidation of any unburned methanol in the exhaust. Such catalysts would also be efficient for the oxidation of the formaldehyde present in the untreated exhaust gases.

A previous study at Ford Motor Company of potential oxidation catalysts for the treatment of methanol-fueled engine exhaust gases (see U.S. Pat. No. 4,304,761) concluded that the base metal silver alone would completely oxidize methanol, at low concentrations and in the presence of excess oxygen (lean mixtures) to carbon dioxide and water vapor without production of deleterious amounts of aldehydes (3% or less), ethers or carbon monoxide. (More recent consensus concerning nonregulated automotive emissions indicates that 3% aldehydes may not be acceptable.) The study used a laboratory simulation of the exhaust gas from an engine that would utilize a lean air/fuel mixture to yield an exhaust gas containing one percent excess oxygen. The results of the study of both the treated silver catalyst and other catalysts for oxidizing methanol (all pretreated by heating at 800° C. for six hours) were obtained at a space velocity of 300,000 $Hr^{-1}$. The 4,304,761 patent is based on results for granular catalytic support material (i.e., without monolithic substrate). This space velocity should not be compared with the space velocities for monolithic catalyst supports. These results show that certain catalysts, such as palladium and rhodium, did not function as well as the silver catalyst, and such patent reports that these materials have an undesirable affinity for producing aldehydes (see the aforesaid patent, column 3, lines 53–55). There was no investigation of how silver, or any of the other catalysts deployed would perform in the presence of little or no oxygen or at conditions (i.e., space velocity) typical of exhaust gases issuing from an internal combustion engine.

Most of the internal combustion engines for automobiles of today, and for the foreseeable future as well, are designed for operation under stoichiometric conditions with exhaust gases containing little or no excess oxygen. Moreover, state-of-the-art technology for closed-loop feedback control of the air/fuel ratio is such that, occasionally, a momentarily fuel-rich mixture will enter the engine followed by a momentarily fuel-lean mixture. Thus, a preferred catalyst system for the exhaust gas treatment should be capable of achieving high methanol conversion (greater than 96%) with minimal formaldehyde formation for exhaust gas which while containing little or no excess oxygen over a finite period, momentarily may be rich or deficient in excess oxygen.

It is therefore a primary object of this invention to provide an efficient method of catalytically oxidizing methanol vapor in a carrier gas with little or no production of aldehydes, the carrier gas containing methanol in a low concentration, i.e., 0.01–1.0%, and containing little or no excess oxygen.

It is also an object of this invention to provide a method of catalytically oxidizing methanol vapor contained in the exhaust gas of an internal combustion engine designed for operation with substantially stoichiometric air/fuel mixtures, the oxidation process achieving 96% or greater conversion of such methanol to $CO_2$ and water vapor aldehyde formation below 1% of the converted methanol.

SUMMARY OF THE INVENTION

The invention concerns a method of substantially completely catalytically oxidizing methanol vapor and/or formaldehyde vapor contained in low concentration in a heated carrier gas having little or no excess oxygen The method comprises treating such carrier gas mixture by passing the gas mixture over a dispersed catalyst consisting of palladium and of (i) rhodium in a weight ratio of Rh/Pd of 0–0.3, and/or (ii) $CeO_2$ in a weight ratio of $CeO_2$/Pd of 0–50, the treatment converting at least 96% of the methanol to $CO_2$ and $H_2O$ and yielding less than 1% of converted methanol as formaldehyde.

The invention achieves high methanol conversion efficiency with little or no production of aldehydes by using palladium as the major active catalyst which has been found to be effective for methanol conversion at low exhaust gas temperatures with little or no excess oxygen. The palladium may also be accompanied by rhodium and/or cerium oxide, the latter two serving, respectively: (a) to enhance the catalyst efficiency for the control of nitrogen oxide emissions, and (b) to improve the catalyst supPort stability, catalyst activity for carbon monoxide oxidation, and oxygen storage capacity. The catalyst is advantageously dispersed on a porous support of gamma alumina coated on a ceramic substrate. The weight of the palladium is preferably in the range of 0.05–1.0% by weight of the catalyst and support. Rhodium, when used, is present in an amount of about 0.02% and ceria in an amount of from 2–5%.

Preferably the method works well when the concentration of methanol in the carrier gas is in the range of 0.01–1.0% and the concentration of formaldehyde in the range of 0.001–0.05%. The temperature of said carrier gas is preferably in the range of 85°–300° C., corresponding to the temperature of exhaust gas typically emitted from an internal combustion engine. Preferably the excess oxygen of said carrier gas is less than 0.5% by weight of the stoichiometric oxygen needed for conversion of the methanol vapor in carrier gas.

DETAILED DESCRIPTION AND BEST MODE

The description in the paragraphs which follow sets forth what we now contemplate to be the best mode of carrying out the method of this invention. While this description presents a preferred embodiment of our method of treating exhaust gases from a methanol fueled internal combustion engine, it is not intended to be a limitation upon the basic principles of the invention.

The method of this invention is directed to the treating of a carrier gas containing methanol vapor and/or formaldehyde vapor, each in low concentration, in a heated condition in the temPerature range of 85°–300° C. More particularly, the method is directed to treating exhaust gases emitted from the burning of methanol fuel in an internal combustion engine. By methanol fuel we mean a substantially pure methanol fuel or a methanol fuel which contains about 95% pure methanol with up to about 5% by volume of other hydrocarbon fuel such as isopentane for the purpose of facilitating cold-start of the engine. In the following specification and claims of the invention, the term "methanol fuel" is employed as defined above.

Methanol fuel can be readily derived in the United States by gasification of coal to produce synthesis gas that can be converted into methanol. Since coal is an abundant resource in the United States, the methanol fuel thus derived will be a viable fuel for an internal combustion engine. In a methanol fueled engine, methanol, in lieu of gasoline, is burned in the combustion chambers to develop power. As with the burning of any fuel, the burning of methanol fuel results in an exhaust gas stream which may contain some unburned methanol. When this unburned methanol is passed over an oxidation catalyst, it may be oxidized in one of four modes. The most desirable mode is an oxidation which produces end products of carbon dioxide and water. Two other secondary paths in the methanol oxidation process result in the production of aldehydes or ethers. Still a fourth mode is that of oxidizing unburned methanol to result in the production of carbon monoxide. It is obvious that the preferred oxidizing mode be one where the resultant products are only carbon dioxide and water vapor.

The Carrier Gas

A first condition imposed upon the environment of the catalytic oxidation process is that of the temperature of the carrier gas. The exhaust gas from a methanol-fueled vehicle is substantially below the exhaust temperatures of a gasoline-fueled vehicle (i.e., by a difference of at least 100° C.). More specifically, during the engine warm-up period, after a cold-start, porportionately large quantities of unburned methanol and other partial oxidation products are present in the engine exhaust gas while the catalyst remains at a low temperature varying from the ambient temperature initially to a temperature of about 300° C. after engine warm-up. Therefore, any catalyst which is effective in the oxidative treatment of unburned methanol must be capable of achieving substantially complete oxidation of methanol at temperatures below 300° C.

A second environmental condition concerns the space velocity for the catalytic treatment. Space velocity is the ratio of volumetric flow rate of the gas to be treated to the catalyst volume used; it is not a velocity in the usual sense of the term, but a measure of catalyst activity, i.e., a high space velocity is obtained by a highly active catalyst. Space velocity thus reflects the catalyst efficiency. For the treatment of automotive exhaust gas, a space velocity in the range of 30,000–60,000 $Hr^{-1}$ has been found to be desirable. Such space velocity can be achieved by a catalyst volume that can be readily accommodated with the existing vehicle framework. A small space velocity would require an impractical large catalyst volume, whereas the catalyst durability during its required useful life determines the upper limit of the space velocity range.

Yet another environmental condition imposed on the oxidizing process is that the carrier gas or exhaust gas contain little or no excess oxygen, such as is the case for the exhaust gas from methanol-fueled engines of today designed for stoichiometric air/fuel mixtures. Typically, such exhaust gas contains only stoichiometric amounts of oxygen necessary for the oxidation of the unburned methanol and partial oxidation products present and may contain a small quantity of excess oxygen, in an amount of less than 0.5% of the stoichiometric oxygen required for complete oxidation of the methanol fuel. The small excess oxygen results from a less than ideal control of the air/fuel ratio at the stoichiometric value. The corresponding engine operation is considered thus under essentially stoichiometric conditions, i.e., such as obtainable by present technology for the air/fuel ratio control.

Catalytic Oxidation

The complete oxidation of such unburned methanol and partial oxidation products, as is present in the engine exhaust gases, is essential in order to minimize the emissions of formaldehyde, among other partial oxidation products, as well as of unburned methanol. Since much of the exhaust emissions takes place during the engine warm-up period, it is imperative to achieve substantially complete oxidation of the unburned methanol and other oxidation products to carbon dioxide and water vapor during this period. It is a relatively simple matter to achieve complete oxidation of the unburned methanol and other products at elevated temperatures (i.e., above 300° C., as is obtained after the engine warm-up period), provided an adequate oxygen supply is present. However, to effect, efficiently and substantially, complete oxidation of the methanol and other oxidation products at low temperatures and under conditions with limited oxygen supply poses a technically difficult problem. Thus, an object of this invention is to demonstrate a method for an efficient catalytic treatment of the methanol-fueled engine exhaust gases with little or no excess oxygen and at relatively low temperatures.

The method comprises treating the carrier gas or exhaust gas by passing it over a dispersed catalyst consisting of palladium and of (i) rhodium in a weight ratio of Rh/Pd of 0–0.3, and/or (ii) $CeO_2$ in a weight ratio of $CeO_2$/Pd of 0–50, the treatment converting at least 96% of the methanol to $CO_2$ and water vapor and yielding less than 1% of converted methanol as formaldehyde.

The catalysts employed in the method of this invention are dispersed in a manner well known in the art on a suitable washcoat material. The washcoat material serves as the catalyst support and is in turn dispersed on a substrate. The substrate is typically a monolithic ceramic matrix which has approximately 60 open square channels along the longitudinal axis per square centimeter of cross-sectional area. The channel walls of such substrate contain a washcoat of about 25 weight percent gamma alumina. The washcoat is applied onto the channel walls of the substrate by conventional techniques well known to those skilled in the art.

There are many washcoat materials known to those skilled in the art which may comprise gamma alumina, alpha alumina and/or zirconia. Gamma alumina, in particular, has an extremely large surface area per unit volume when compared to other washcoat materials and is the preferred washcoat material. A washcoat stabilization material may be included in the washcoat composition.

Catalyst Chemistry

The quantitative selection of the catalyst formulation is of significance to this invention. Palladium is the major active component in the catalytic exhaust gas treatment of the invention; it is impregnated onto the washcoat, preferably in amounts of 0.05–1.0% by weight of the precoated substrate. The specific amount of palladium employed depends on the requirements for the control of the regulated emissions of carbon monoxide, hydrocarbons and nitrogen oxides, as well as of nonregulated but undesirable emissions of methanol and formaldehyde etc., and ultimately on the volume as well as of the composition and temperature of the exhaust gases to be treated. For each specific application of the catalytic treatment, the Pd loading must be optimized to minimize the precious metal requirement while insuring the desired catalyst activity during its required useful life for 50,000 vehicle miles. We have found that Pd loading of 0.05–1.0% would encompass the range of practical interest.

For the control of nitrogen oxides emissions, it may be necessary to co-impregnate a small amount of rhodium along with the palladium in a weight ratio of rhodium/palladium of up to 0.3/1, since rhodium is more effective than is palladium for the reduction of the nitrogen oxide in the exhaust gas.

To improve the thermal stability of the catalyst support, typically as a washcoat of gamma alumina, ceria (cerium oxide) may be included in the catalyst formulation, preferably in a weight ratio of up to 50/1. Under certain modes of vehicle driving conditions, the composition and temperature of the resultant engine exhaust gas can subject the catalyst to high temperatures resulting in the loss of support surface area and hence of catalyst activity. The addition of ceria serves to enhance thermal stability of the alumina support and improve the catalyst activity for carbon monoxide oxidation and catalyst oxygen storage capacity, both of which are important in order to maximize the catalyst performance.

The catalyst activity for carbon monoxide oxidation is important because carbon monoxide emission must meet the regulatory standards and because the oxidation of carbon monoxide, especially during the engine warm-up period, provides an important source of chemical heat needed to raise the temperature of the catalyst as the catalyst activity would increase exponentially with temperature. The catalyst oxygen storage capacity enables the catalyst to store excess oxygen during a momentarily lean exhaust environment which will be available for the oxidation process during a subsequent momentarily rich exhaust environment, thereby improving the overall carbon monoxide and hydrocarbon conversions. Similarly, during a momentarily rich environment the catalyst will become reduced, after the release of any stored oxygen, and the reduced catalyst will be reoxidized by nitrogen oxides as well as by oxygen present in a subsequent momentarily lean exhaust environment, thereby enhancing the overall nitrogen oxides conversion.

However, there is also an interaction between the ceria and the precious metal which adversely affects the precious metal catalyst activity for the oxidation of certain organic compounds including methanol and formaldehye. We have found such adverse interaction effects can be compensated by increasing the precious metal loading at a specific desirable level of ceria, so as to improve the oxidation of methanol with little or no production of formaldehyde while ensuring benefits of support stability and reduced catalyst costs.

EXAMPLES

Several catalyst materials, without as well as within the teaching of this invention, were evaluated in an experimental apparatus which consisted of a standard laboratory flow reactor system as described in an article by E C Su et al in *Applied Catalysis*, Vol. 12, p. 59 (1984). The catalyst materials were prepared by conventional impregnation techniques and the substrate was a monolithic cordierite structure with 62 square channels per square centimeter and with 25 weight percent gamma alumina as a washcoat on the channel walls. The washcoated substrates impregnated with the catalysts were calcined in air at 500° C., each thermally aged four hours at 800° C. Each aged catalyst was exposed to a simulated exhaust gas at a temperature of 150° C. and at a space velocity of 60,000 $Hr^{-1}$ to ascertain its efficiency under typical conditions for exhaust gas treatment during the engine warm-up period. To explore the usefulness of catalysts which had low activity, the feed gas temperature was increased until substantial methanol conversion was obtained. The simulated exhaust gas was made up by mixing a methanol saturated nitrogen stream with the necessary amounts of air and dilution nitrogen to yield the desired $O_2$ and methanol mixture. The composition of the feed gas was varied by changing the oxygen concentration at a constant methanol concentration of 0.5 volume percent. This level of methanol concentration had been observed in the exhaust gas from a methanol fueled vehicle during the engine warm-up period. In terms of lambda, defined as the actual ratio of $O_2$/methanol over the theoretical ratio of $O_2$/methanol for complete oxidation, the feed gas composition was varied in the range of 0.8–8.0 lambda. The methanol partial oxidation products formed were determined by Fourier transformed infrared (FTIR) spectroscopic analysis of the reactor effluent collected in a Teflon bag. The effluent components analyzed included carbon oxides, methanol, formaldehyde, formic acid, methyl formate and dimethyl ether. The oxygen concentration in the feed gas was determined by a Ford/lambda oxygen analyzer.

Table 1 shows the catalyst formulations evaluated in the laboratory study in terms of their active components as percent of the total weight of the washcoated substrate plus the catalyst components. Two silver catalysts were studied: (i) a silver-only catalyst containing 0.6% silver and (ii) a silver+ceria catalyst containing the same amount of silver as (i) plus 4% of the cerium as ceria. The silver contents of these catalysts represent the best loading determined by previous researchers in the prior art.

The palladium catalysts studied included: (i) a palladium-only catalyst containing 0.15% palladium, (ii) a palladium+ceria catalyst, designated (Pd+Ceria)/I, containing the same amount of palladium as (i) plus 3.3% of cerium as ceria, (iii) a palladium+ceria catalyst, designated (Pd+Ceria)/II, containing 0.41% palladium plus 4.2% of cerium as ceria and (iv) a palladium+rhodium catalyst containing 0.11% of palladium and 0.02% of rhodium plus 4.0% of cerium as ceria. The first three palladium catalysts serve to demonstrate the effects of palladium and ceria loading, within the range of practical interest, on the methanol oxidation. The fourth palladium catalyst serves to show the effects, if any, of a rhodium-addition, in an amount typically employed in commercial catalysts formulated for the control of the regulated emissions from gasoline-fueled vehicles. In addition, a ceria-only catalyst (4.2%) was studied to ascertain the characteristics of methanol oxidation over ceria alone.

As shown in Table II, formaldehyde formation from methanol oxidation over the silver catalysts increases with decreasing lambda, that is, the more one approaches stoichiometric conditions, the less effective is the silver catalyst. This is consistent with the known kinetics for the methanol oxidation over silver, indicating that excess oxygen is essential for high conversion and minimal formaldehyde formation. We note that silver catalysts are used in commercial production of formaldehyde from partial oxidation of methanol with limited oxygen supply.

The silver catalyst, moreover, failed to achieve high methanol conversion at temperatures below 180° C. As shown in Table II, at a temperature of 150° C. only 20% conversion was obtained even with excess oxygen at an extremely high lambda of 7. It should be noted that, in terms of the alumina washcoat alone, the silver loading for the silver catalysts studied is near the optimum found. A further increase in catalyst loading will not achieve higher activity such as obtainable with precious metal catalysts. The silver catalyst containing ceria seems to show an appreciable increase in the formaldehyde formation for the same conditions. Since ceria, by itself, produces a relatively large amount of formaldehyde, as has been reported in the literature, it may be responsible for the increase of formaldehyde observed for the ceria+silver catalyst.

Whereas the silver catalysts fail to achieve high methanol conversion with minimal formaldehyde formation at temperatures below 200° C., especially when there is little or no excess oxygen, the palladium-based catalysts show greater efficiency for methanol oxidation and produce little formaldehyde even as lambda approaches unity, i.e., when there is little or no excess oxygen. These results demonstrate that palladium is the preferred catalyst for the treatment of exhaust gases from methanol-fueled engines operated under stoichiometric conditions. As noted earlier, even with engines operated under stoichiometric conditions, momentarily the exhaust gas may contain excess oxygen as well as become deficient in oxygen. The laboratory results show also that the palladium catalyst formulation can be optimized (by adding ceria and increasing amount of palladium) to achieve high methanol conversion with minimal formaldehyde formation over a wide range of lambda.

The results for palladium-based catalysts show a trend for formaldehyde formation to increase with increasing lambda with a corresponding but relatively small reduction in methanol conversion. Furthermore, this trend is somewhat aggravated by the addition of ceria at a constant palladium loading--see the results for the Pd-only catalyst and catalyst (Pd+Ceria)/I. The adverse effects associated with ceria addition, which is desirable as noted earlier, is due probably to an interaction between the $Ce^{+4}$ ions and the palladium present as the former would promote the latter to an oxidized state which is less active for complete oxidation of certain organic compounds including methanol and formaldehyde. This adverse effect can be minimized by optimizing the ceria/palladium ratio for a specific level of ceria required from the standpoint of the three catalyst performance characteristics, so as to attain high methanol conversion and low formaldehyde formation at temperatures of 200° C. or below.

While the final optimization of the palladium-based catalyst for the exhaust gas treatment remains to be made for each specific class of methanol-fueled vehicles, we demonstrate by catalyst (Pd+Ceria)/II an optimized catalyst which contains a relatively high level of ceria such as employed in catalyst formulations for the treatment of gasoline-fueled engine exhaust gas. As shown in Table II, this catalyst achieved the highest methanol conversions with the least formaldehyde formation over a wide range of lambda at a relatively low temperature of 150° C. Additional data obtained with this catalyst (not shown in Table II) indicates that even at a temperature of 85° C. it is capable of achieving a methanol conversion over 96% with only about 1% of the converted methanol as formaldehyde for lambda in the range of 1.0-7.0.

Since a palladium-based catalyst may contain a small amount of rhodium, primarily for the control of the nitrogen oxides emissions, we have evaluated a (Pd+Rh) catalyst containing 0.2% rhodium such as typically employed in catalyst formulations for the treatment of gasoline-fueled engine exhaust gas. The results obtained with this catalyst (Table II) demonstrate that the addition of rhodium does not materially affect the methanol oxidation characteristics of the palladium-based catalyst.

Additional data support for the invention is illustrated by the results in Table III obtained from a vehicle evaluation of several catalysts of interest, all based on the use of precoated monolithic substrates, for the treatment of methanol-fueled engine exhaust gas. The vehicle study comprised the measurement of the regulated emissions of carbon monoxide, hydrocarbons and nitrogen oxides and of methanol and formaldehyde emissions by the standard Federal Testing Procedure (FTP). The FTP test consists of a prescribed sequence of driving modes after a cold-start. The emissions of methanol and formaldehyde during the test were based on analysis of the vehicle tailpipe gas by the FTIR technique as used in the laboratory study. One and the same vehicle calibrated for stoichiometric air/fuel mixtures was employed to compare the performance of a silver catalyst, a palladium catalyst and a commercial production catalyst used in exhaust gas treatment for gasoline-fueled vehicles. The production catalyst was a three-way catalyst containing platinum, rhodium and ceria designed for the treatment of exhaust gas from an otherwise identical vehicle operated on gasoline fuel. The volume of the silver and palladium catalysts is the same as that of the production catalyst, i.e., 0.6 liter. The composition of each catalyst is shown in column 1 of Table III. The palladium catalyst was further evaluated for the treatment of exhaust gases from a similar vehicle calibrated for lean air/fuel mixtures. The methanol fuel used comprised 95% by weight of pure methanol plus 5% by weight of isopentane. As is the practice of current technology for the treatment of exhaust gas from gasoline-fueled engines, each catalyst under evaluation was followed by an identical conventional oxidation catalyst, which serves primarily to improve the control of carbon monoxide and hydrocarbon emissions.

As shown in Table III, the palladium catalyst is the most effective for the reduction of both the methanol and formaldehyde emissions from a methanol-fueled vehicle operated under stoichiometric conditions, the methanol and formaldehyde emissions after treatment by the other two catalysts being a least twice the corresponding emissions after treatment by the palladium catalyst. Whereas the silver catalyst failed to meet the standards for all the three regulated emissions and the production catalyst failed to meet the standards for both carbon monoxide and hydrocarbons, the palladium catalyst met the standards for both hydrocarbons and nitrogen oxides, failing to meet the carbon monoxide standard by only 0.7 gm/mile, as compared to the failure of the other two catalysts to meet the carbon monoxide emissions standard of 3.4 gm/mile by 2.8–4.0 gm/mile. Thus, from the standpoint of the regulated emissions, the palladium catalyst is also the most effective. As the vehicle study serves primarily to demonstrate the relative merit of the three potential catalyst systems for the treatment of methanol-fueled vehicle exhaust gas, the palladium catalyst has not been optimized in the manner described above. As indicated by the results for the palladium-based catalysts shown in Table II, a moderate increase in the palladium and ceria loading for the palladium catalyst used in the vehicle study would suffice to meet the carbon monoxide standards as well as to further minimize the methanol and formaldehyde emissions (i.e., less than 1% formaldehyde under essentially stoichiometric conditions and less than 1.8% under momentarily rich in excess oxygen conditions).

The results shown in Table III illustrate also an important effect of vehicle calibration on the catalyst efficiency as evidenced by the poor performance of the palladium catalyst in the treatment of exhaust gases from the vehicle with lean calibration. This is due to three interacting factors. First, as noted earlier, the palladium catalyst is less active in the presence of such excess oxygen, as in the case of lean calibration, than in the presence of little or not excess oxygen. Second, the exhaust gas from the stoichiometric engine is at a significantly higher temperature than is that from the lean engine. Measurement of the exhaust gas temperature during the emission test indicates that the exhaust gas from the stoichiometric engine is, in general, at a temperature at least 50° C. higher than from the lean engine. And last, the feedgas emissions, i.e., the emissions produced in the engine as found in the feedgas for the catalytic treatment, from the stoichiometric engine are, in general, significantly lower than those from the lean engine. As shown in Table III, the feedgas from the stoichiometric engine contained much less methanol and formaldehyde as well as total hydrocarbons than from the lean engine. The feedgas from the stoichiometric engine contained greater amounts of carbon monoxide and nitrogen oxides than from the lean engine, however, because little excess oxygen and a high combustion temperature in a stoichiometric engine favor the formation of, respectively, carbon monoxide and nitrogen oxides in the combustion process.

The last two factors constitute an important advantage associated with engine operation under stoichiometric conditions. We note that catalyst activity increases exponentially with temperature, especially during the warm-up period, and that during this critical period of exhaust gas treatment the catalyst temperature depends initially on the sensible heat of the exhaust gas until the catalyst light-off temperature is reached and thereafter also on the chemical heat envolved, mostly from the oxidation of carbon monoxide and hydrogen present in the exhaust gas. The high carbon monoxide emissions from the stoichiometric engine may thus be advantageously utilized as a source for chemical heat provided the catalyst light-off temperature is sufficiently low, i.e., the catalyst becomes effective for carbon monoxide oxidation at low temperatures.

The interacting factors described above underscore also the Poor formaldehyde conversion with the palladium catalyst in the treatment of the exhaust gas, i.e., 29% as compared to a formaldehyde conversion of 87% in the case for the stoichiometric engine. In addition to the low catalyst activity due to the presence of much excess oxygen and low exhaust gas temperature as well as limited source for chemical heat, the increase in formaldehyde formation from the methanol conversion in the presence of excess oxygen would cause a significant reduction in the overall formaldehyde conversion; this is important in view of the quantitative disparity between the methanol and formaldehyde emissions. We note also that the low tailPipe carbon monoxide emissions in the case of the lean engine is due to an appreciable decrease in the carbon monoxide formation in the lean engine, in spite of the reduction in catalyst activity associated with low exhaust gas temperature.

While particular embodiments of the invention have been illustrated and described, it will be noted that various changes and modifications may be made without departing from the invention, and it is intended to cover in the appended claims all such changes and modifications as fall within the principle and scope of the invention.

TABLE I

Composition of Catalysts Used in Laboratory Study

| Catalyst Designation | Active Components, wt. % of whole catalyst (substrate, washcoat and catalyst) | | | |
|---|---|---|---|---|
| | Ag | Pd | Rh | Ce |
| Ag | .6 | — | — | — |
| Ag + CeO$_2$ | .6 | — | — | 4.0 |
| Pd | — | .15 | — | — |
| (Pd + CeO$_2$)$_I$ | — | .15 | — | 3.3 |
| (Pd + CeO$_2$)$_{II}$ | — | .41 | — | 4.2 |
| Pd + Rh | — | .11 | .02 | 4.0 |
| CeO$_2$ | — | — | — | 4.2 |

TABLE II

Laboratory Evaluation of Catalysts for Methanol Oxidation

| Catalyst Designation | Temperature of Feed Gas (°C.) | Lambda | Methanol Conversion (Percent) | Formaldehyde Produced as % of Converted Methanol |
|---|---|---|---|---|
| Ag | 200 | 7.0 | 99 | .02 |
| " | " | 1.1 | 89 | .3 |
| " | 180 | 6.0 | 93 | .1 |
| " | " | 1.8 | 73 | .3 |
| " | " | 1.1 | 47 | .9 |
| " | 150 | 7.0 | 20 | 1.2 |
| Ag + CeO$_2$ | 200 | 8.0 | 98 | .2 |
| " | " | 1.1 | 89 | .6 |
| Pd | 150 | 8.0 | 98 | 5.3 |
| " | " | 2.0 | 99 | 2.0 |
| " | " | 1.0 | 99+ | .4 |
| (Pd + CeO$_2$)$_I$ | 150 | 7.0 | 96 | 6.0 |
| " | " | 2.0 | 97 | 4.0 |
| " | " | 1.0 | 97 | 0.5 |
| (Pd + CeO$_2$)$_{II}$ | " | 7.0 | 99 | .8 |
| " | " | 2.0 | 99+ | .3 |
| " | " | 1.0 | 100 | .06 |
| Pd + Rh | " | 7.0 | 99 | 1.7 |
| " | " | 2.0 | 99+ | .8 |
| " | " | 1.0 | " | .2 |
| CeO$_2$ | 200 | 8.0 | 6 | 16.0 |
| " | 150 | 8.0 | 3 | 6.0 |

TABLE III

Vehicle Evaluation of Catalysts for Emissions Control

| Catalyst Formulation[1] | Vehicle Calibration | Regulated Emissions (gm/ml)[2] | | | | | | Nonregulated Emissions (mg/ml)[3] | | | |
|---|---|---|---|---|---|---|---|---|---|---|---|
| | | CO | | HC | | NOx | | Formaldehyde | | Methanol | |
| | | FG | Tailpipe | FG | Tailpipe | FG | Tailpipe | FG | Tailpipe | FG | Tailpipe |
| Silver (0.4 Ag) | Stoichiometric | 21.2 | 6.2(71) | 1.62 | 0.58(64) | 2.06 | 1.03(50) | 0.31 | 0.10(66) | 2.52 | 0.48(81) |
| Palladium (0.2 Pd + 2 Ce) | " | " | 4.1(81) | " | 0.28(83) | " | 0.82(60) | " | 0.04(87) | " | 0.21(92) |
| Production[4] (0.17 Pt + .02 Rh + 2 Ce) | " | " | 7.4(65) | " | 0.54(67) | " | 0.81(61) | " | 0.13(57) | " | 0.55(78) |
| Palladium (0.2 Pd + 2 Ce) | Lean | 6.2 | 3.4(45) | 2.43 | 0.69(72) | 1.44 | 0.92(36) | 0.55 | 0.39(29) | 4.35 | 1.01(77) |

[1] Numbers in parenthesis denote weight percent for active components shown.
[2] Federal emission standards in grams per mile are 3.4 CO, 0.41 HC and 1.0 NO; see also note (3) below.
[3] Numbers for FG (feedgas) and tailpipe denote emissions before and after catalyst, respectively. The number in parenthesis denotes percent conversion, i.e., 100 × (FG Emission -Tailpipe Emission)/FG Emission.
[4] A commercial monolithic three-way catalyst-see text.

We claim:

1. A method of substantially completely catalytically oxidizing methanol vapor and/or formaldehyde vapor contained in a carrier gas heated to a temperature of 85°–200° C. and having excess oxygen in an amount less than 0.5% by weight of the stoichiometric oxygen required for complete oxidation of said methanol vapor, comprising the treatment of said gas mixture by means of a dispersed catalyst consisting of palladium and of (i) rhodium in a weight ratio of Rh/Pd of 0–0.3, and/or (ii) CeO$_2$ in a weight ratio of CeO$_2$/Pd of 0–50, said treatment converting at least 96% of the methanol to CO$_2$ and water vapor and yielding less than 1% of converted methanol as aldehydes.

2. The method as in claim 1, in which the treatment of said gas mixture is at a space velocity in the range of 40,000 to 60,000 Hr$^{-1}$.

3. The method as in claim 2, in which the concentration of methanol vapor is in the range of 0.01–1.0% and the concentration of formaldehyde vapor is in the range of 0.001–0.05%.

4. The method as in claim 1, in which said catalyst has been subjected to thermal aging by heating to 800° C. for 4 hours.

5. The method as in claim 1, in which said carrier gas in the exhaust gas from a methanol-fueled internal combustion engine calibrated for stoichiometric air/fuel mixtures, said catalytic oxidation forming less than 1% formaldehyde under essentially stoichiometric conditions.

6. The method as in claim 1, in which said catalyst is dispersed in a gamma alumia support coated on the walls of a monolithic ceramic substrate and palladium is present in said catalyst in an amount of 0.02–1.0% by weight of the combined catalyst, coating and substrate.

7. The method as in claim 6, in which rhodium is present in said catalyst in an amount of about 0.02% of the combined weight of the catalyst, coating and substrate.

8. The method as in claim 6, in which ceria is present in said catalyst in an amount of 2–5% by weight of the combined catalyst, coating, and substrate.

* * * * *